US007823890B2

(12) United States Patent
Chen

(10) Patent No.: US 7,823,890 B2
(45) Date of Patent: Nov. 2, 2010

(54) CHUCK

(76) Inventor: Tsai-Ching Chen, No. 202, Lane 330, Sec. 7, Chang Lu Road, Fu Hsing Shiang, Chang Hua Hsien (TW)

( * ) Notice: Subject to any disclaimer, the term of this patent is extended or adjusted under 35 U.S.C. 154(b) by 1036 days.

(21) Appl. No.: 11/555,356

(22) Filed: Nov. 1, 2006

(65) Prior Publication Data

US 2008/0100005 A1 May 1, 2008

(51) Int. Cl.
*B23B 31/28* (2006.01)
*B23B 31/107* (2006.01)

(52) U.S. Cl. .......................... 279/143; 279/75; 279/82; 279/128; 279/904; 279/905

(58) Field of Classification Search .................. 279/71, 279/74, 75, 81, 82, 128, 143, 904, 905; *B23B 31/02, B23B 31/28, 31/107*
See application file for complete search history.

(56) References Cited

U.S. PATENT DOCUMENTS

| | | | | |
|---|---|---|---|---|
| 2,959,943 | A * | 11/1960 | Allen | 464/158 |
| 3,138,393 | A * | 6/1964 | Livingston | 285/277 |
| 4,237,946 | A * | 12/1980 | Leitner | 81/429 |
| 4,828,277 | A * | 5/1989 | De Bastiani et al. | 279/22 |
| 5,062,749 | A * | 11/1991 | Sheets | 279/75 |
| 5,188,378 | A * | 2/1993 | Erlenkeuser | 279/22 |
| 6,126,370 | A * | 10/2000 | Wheeler et al. | 408/239 R |
| 6,270,085 | B1 * | 8/2001 | Chen et al. | 279/22 |
| 6,311,989 | B1 * | 11/2001 | Rosanwo | 279/75 |
| 6,363,819 | B1 * | 4/2002 | Li | 81/438 |
| 6,755,423 | B2 * | 6/2004 | Chiu | 279/30 |
| 6,874,791 | B2 * | 4/2005 | Chen et al. | 279/75 |
| 6,929,266 | B2 * | 8/2005 | Peters et al. | 279/82 |
| 6,973,858 | B2 * | 12/2005 | Huang | 81/177.85 |
| 7,175,184 | B1 * | 2/2007 | Rinner et al. | 279/43 |
| 7,195,247 | B2 * | 3/2007 | Shu | 279/75 |
| 7,435,042 | B2 * | 10/2008 | White et al. | 408/127 |
| 7,448,302 | B2 * | 11/2008 | Huang | 81/438 |
| 7,469,909 | B2 * | 12/2008 | Strauch et al. | 279/75 |
| 7,481,136 | B2 * | 1/2009 | Chiang | 81/177.75 |
| 7,669,860 | B2 * | 3/2010 | Chiang | 279/143 |
| 7,726,664 | B2 * | 6/2010 | Peters | 279/143 |
| 2003/0230862 | A1 * | 12/2003 | Peters et al. | 279/82 |
| 2004/0081523 | A1 * | 4/2004 | Vasudeva et al. | 408/240 |
| 2006/0022416 | A1 * | 2/2006 | Chen | 279/74 |
| 2006/0097464 | A1 * | 5/2006 | Strauch et al. | 279/75 |
| 2006/0175773 | A1 * | 8/2006 | Tsai et al. | 279/143 |
| 2007/0108706 | A1 * | 5/2007 | Cornwell et al. | 279/143 |
| 2008/0217870 | A1 * | 9/2008 | Shibata | 279/82 |
| 2009/0174157 | A1 * | 7/2009 | Chang | 279/99 |

OTHER PUBLICATIONS

Taiwanese Patent No. M290799, May 21, 1995, 6 pages.

* cited by examiner

*Primary Examiner*—Eric A Gates
(74) *Attorney, Agent, or Firm*—Banger Shia

(57) ABSTRACT

A chuck includes a driving element, a sleeve movably installed on the driving element and a ring fit in the socket. The driving element includes a socket for receiving a bit, a shank extended from and a shoulder formed between the socket and the shank. The sleeve includes a shoulder formed on an internal side for contact with the shoulder of the driving element for avoiding detachment thereof from the driving element in a direction. The restraint is fit in the socket for avoiding detachment of the sleeve from the driving element in an opposite direction.

10 Claims, 14 Drawing Sheets

CHUCK

BACKGROUND OF INVENTION

1. Field of Invention

The present invention relates to a chuck.

2. Related Prior Art

Disclosed in Taiwanese Patent M290799 is a conventional chuck. As shown in FIGS. 3 and 4 of the patent, the telescopic chuck is used to drive a bit A that includes a tip indicated by a letter "a" and a shank referred to by a letter "c." The telescopic chuck includes a socket 20, a sleeve 30, a restraint 40, a C-clip 50 and a spring 60. The socket 20 defines a space 23 for receiving the shank of the bit A. A groove 22 is defined in an external side of the socket 20. A shoulder 33 is formed on an internal side of the sleeve 30. The sleeve 30 is movably installed on the socket 20. The C-clip 50 is disposed in the groove 22. The helical spring 60 is installed on the socket 20. A ring 43 is formed on an internal side of the restraint 40. The restraint 40 is movably installed on the socket 20. The restraint 40 is connected to the sleeve 30 by a C-clip. The sleeve 30 and the restraint 40 are kept on the socket 20 since the shoulders 33 and 43 are restrained by the C-clip 50. The spring 60 is compressed between the shoulder 43 and the C-clip 50. A magnetic ring 31 is fit in the sleeve 30 near the space 23 defined in the socket 20. As shown in FIGS. 5 and 6 of the patent, the magnetic ring 31 can be used to attract a screw 70 driven by the bit A held by the chuck. The chuck includes a complicated structure made of many elements in a lengthy process. The chuck is inevitably expensive.

The present invention is therefore intended to obviate or at least alleviate the problems encountered in prior art.

SUMMARY OF INVENTION

According to the present invention, a chuck includes a driving element, a sleeve movably installed on the driving element and a ring fit in the socket. The driving element includes a socket for receiving a bit, a shank extended from and a shoulder formed between the socket and the shank. The sleeve includes a shoulder formed on an internal side for contact with the shoulder of the driving element for avoiding detachment thereof from the driving element in a direction. The restraint is fit in the socket for avoiding detachment of the sleeve from the driving element in an opposite direction.

The primary advantage of the chuck according to the present invention is a low cost due to a simple structure made of a small number of elements in a short process.

Other advantages and features of the present invention will become apparent from the following description referring to the drawings.

BRIEF DESCRIPTION OF DRAWINGS

The present invention will be described through detailed illustration of four embodiments referring to the drawings.

DETAILED DESCRIPTION OF EMBODIMENTS

Figure 1:
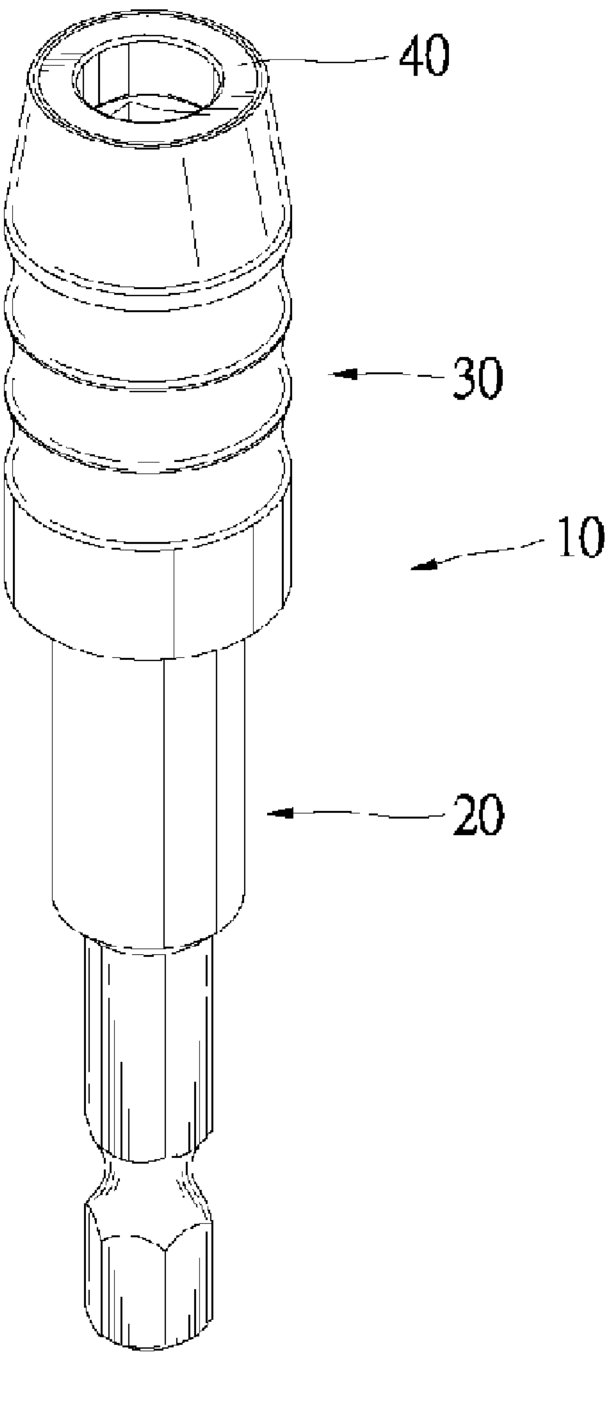
FIG. 1 is a perspective view of a chuck according to the first embodiment of the present invention.
Figure 2:
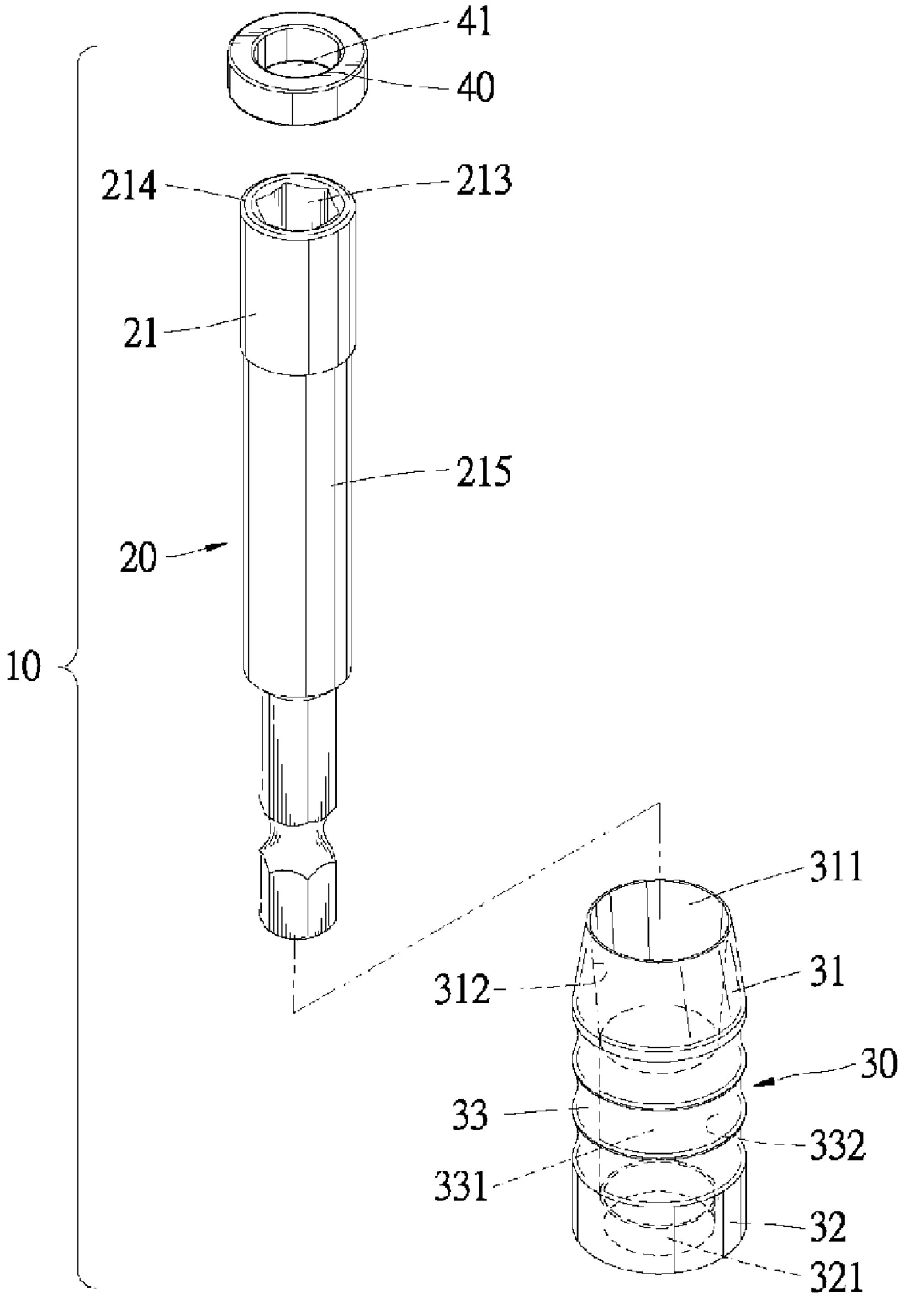
FIG. 2 is an exploded view of the chuck shown in FIG. 1.
Figure 3:
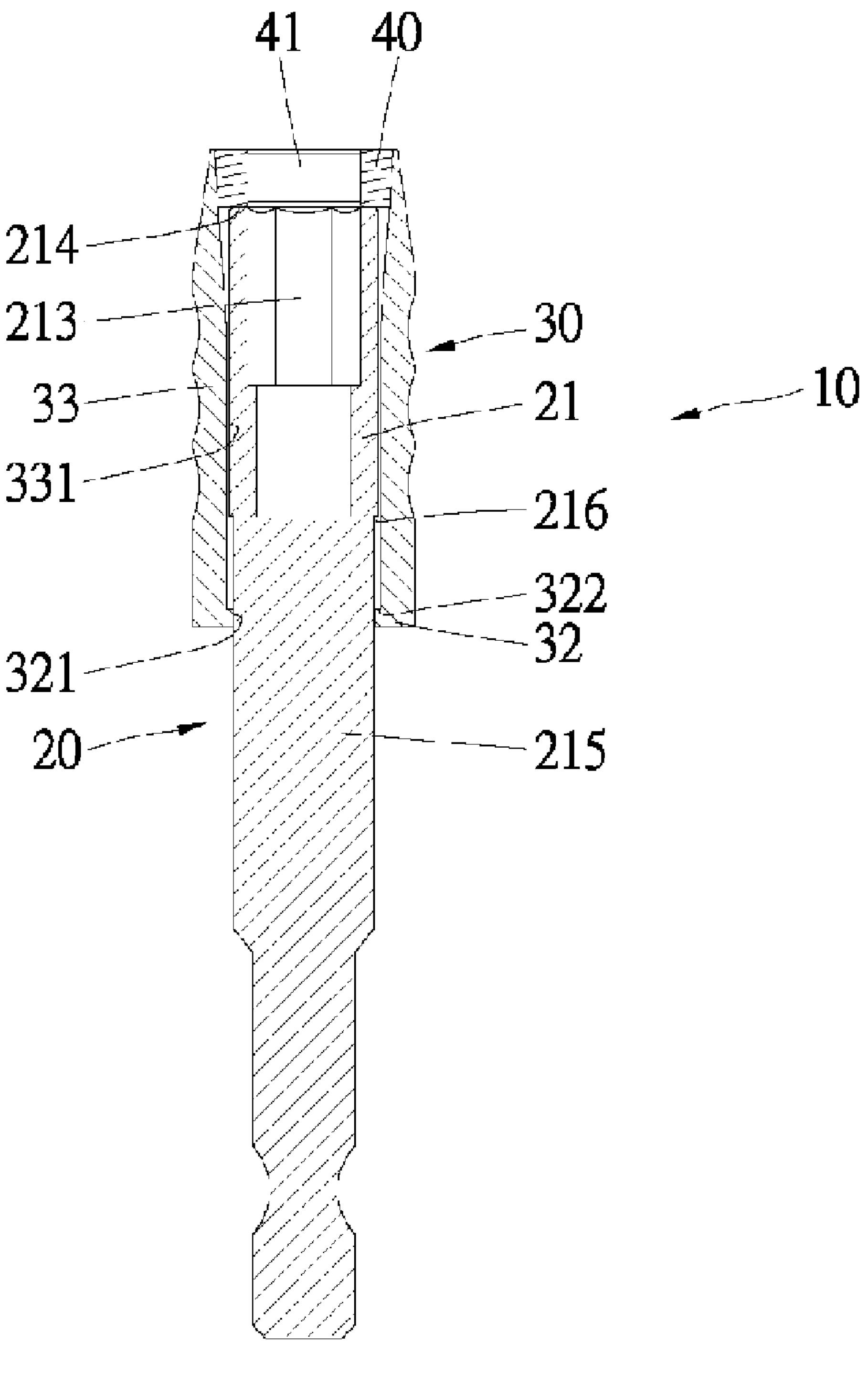
FIG. 3 is a cross-sectional view of the chuck shown in FIG. 1.

Referring to FIGS. 1 through 4, there is shown a chuck 10 according to a first embodiment of the present invention. The chuck 10 is used to drive a bit 50 formed with a root 51, a tip 52 and a shank between the root 51 and the tip 52. The chuck 10 includes a driving element 20, a sleeve 30 and a restraint 40.

The driving element 20 includes a socket 21 and a shank 215 extended from the socket 21. The diameter of the socket 21 is larger than that of the shank 215 so that a shoulder 216 is formed between them. The socket 21 defines a space 213 for receiving the root 51 of the bit 50. The socket 21 is formed with an edge 214.

The sleeve 30 includes a first end 31, a second end 32 and a middle portion 33 between the ends 31 and 32. The first end 31 includes an internal side 312 that defines a taper space 311 that gets smaller towards the middle portion 33. The second end 32 includes an internal side that defines a space 321. A shoulder 322 is formed on the internal side of the second end 32. The middle portion 33 includes an internal side 332 that defines a space 331. The sleeve 30 is movably installed on the driving element 20. The shoulder 322 can be restrained by the shoulder 216 for avoiding detachment of the sleeve 30 from the driving element 20 in a first direction.

The restraint 40 may be a magnetic element. The restraint 40 defines an aperture 41. The restraint 40 is fit in the taper space 311 so that the restraint 40 is firmly connected to the sleeve 30. The restraint 40 can be restrained by the edge 214 for avoiding detachment of the sleeve 30 from the driving element 20 in a second direction opposite to the first direction.

Figure 4:
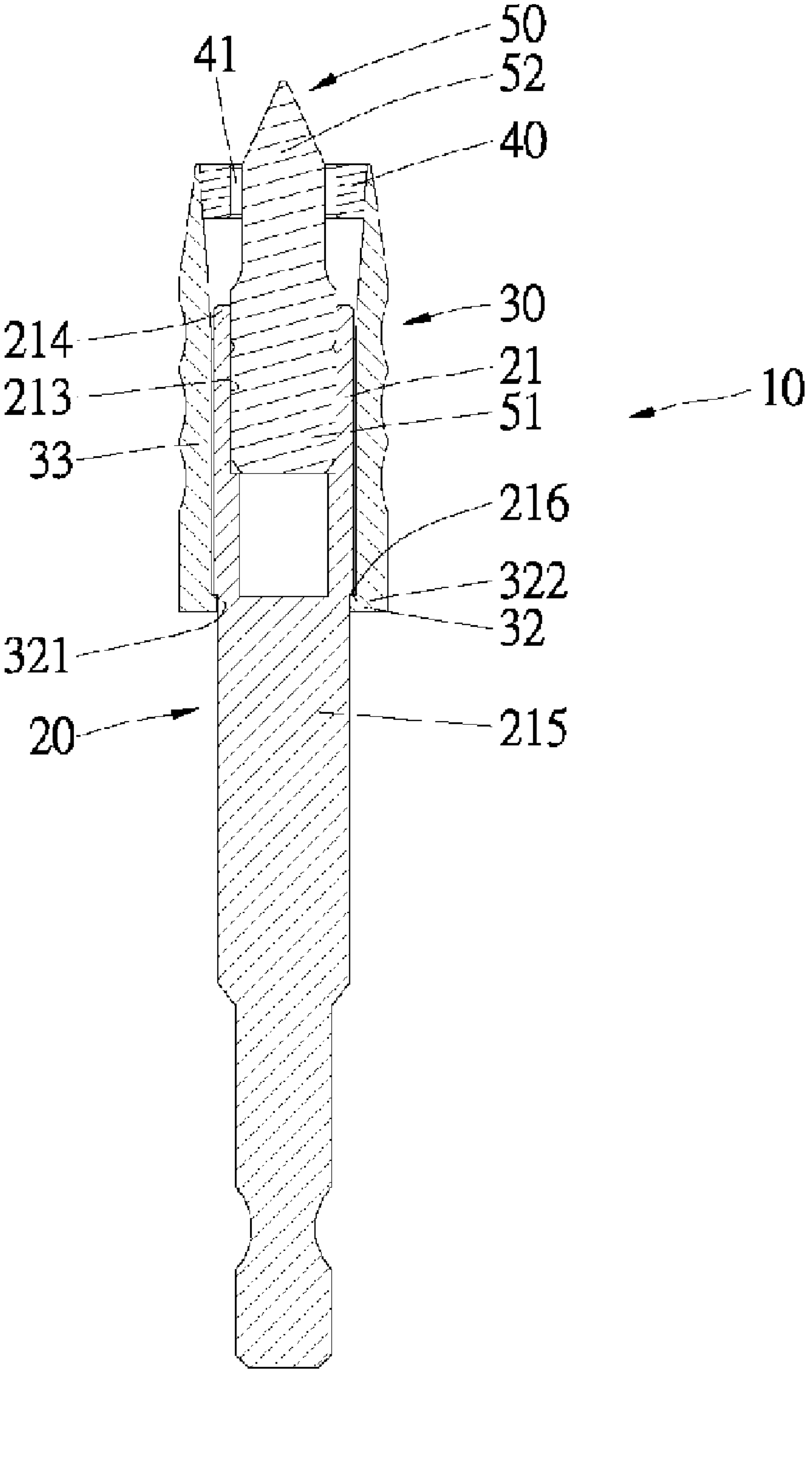
FIG. 4 is a cross-sectional view of a bit driven by the chuck shown in FIG. 3.
Figure 5:
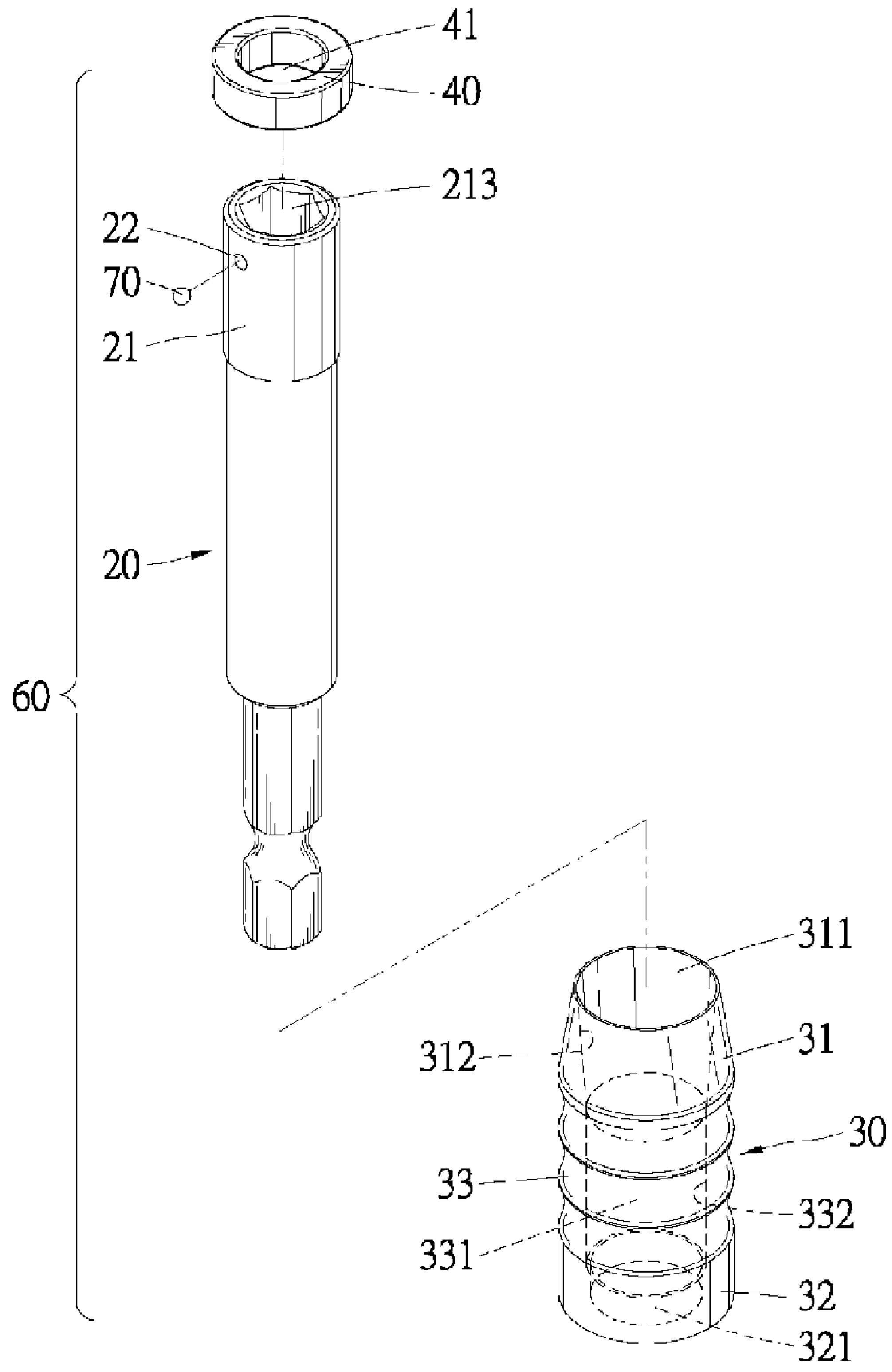
FIG. 5 is an exploded view of a chuck according to the second embodiment of the present invention.
Figure 6:
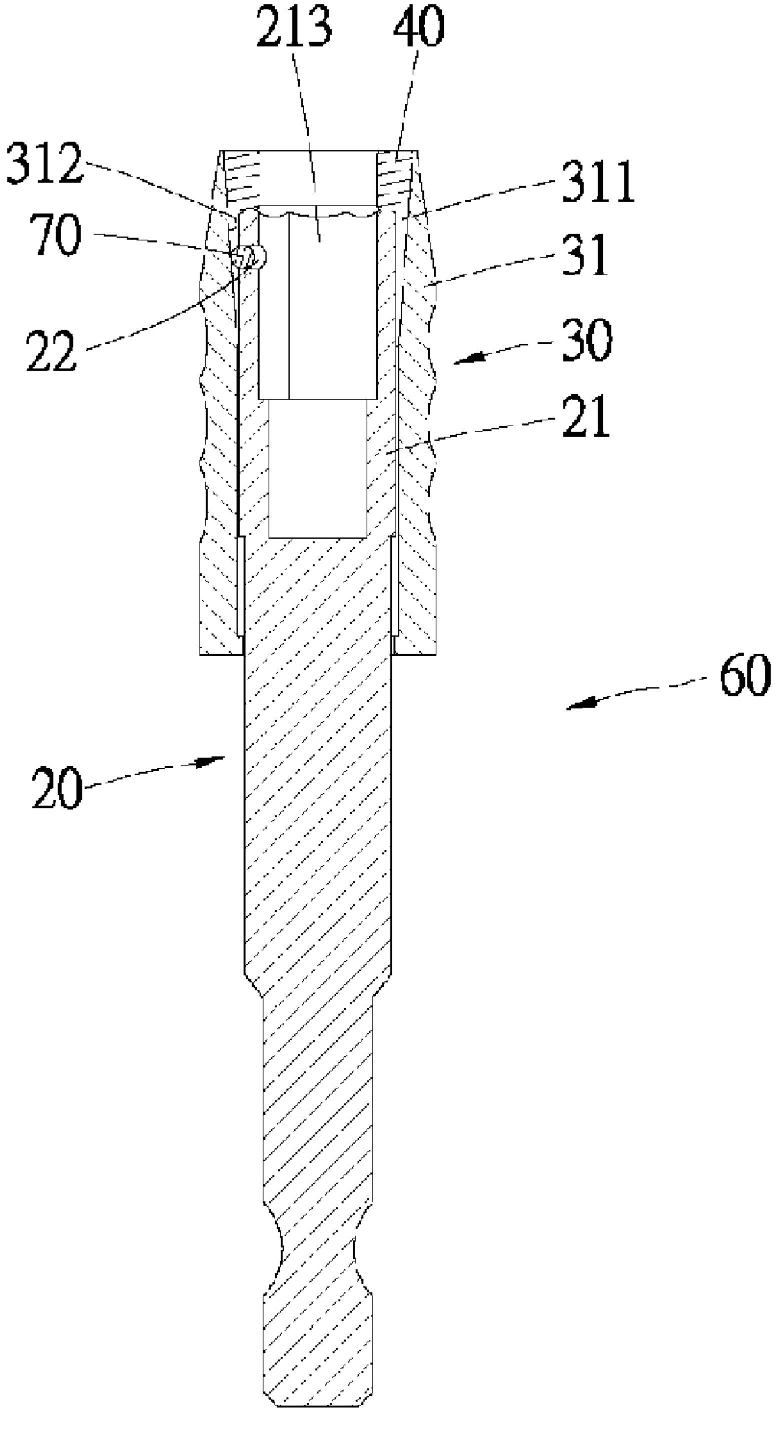
FIG. 6 is a cross-sectional view of the chuck shown in FIG. 5.
Figure 7:
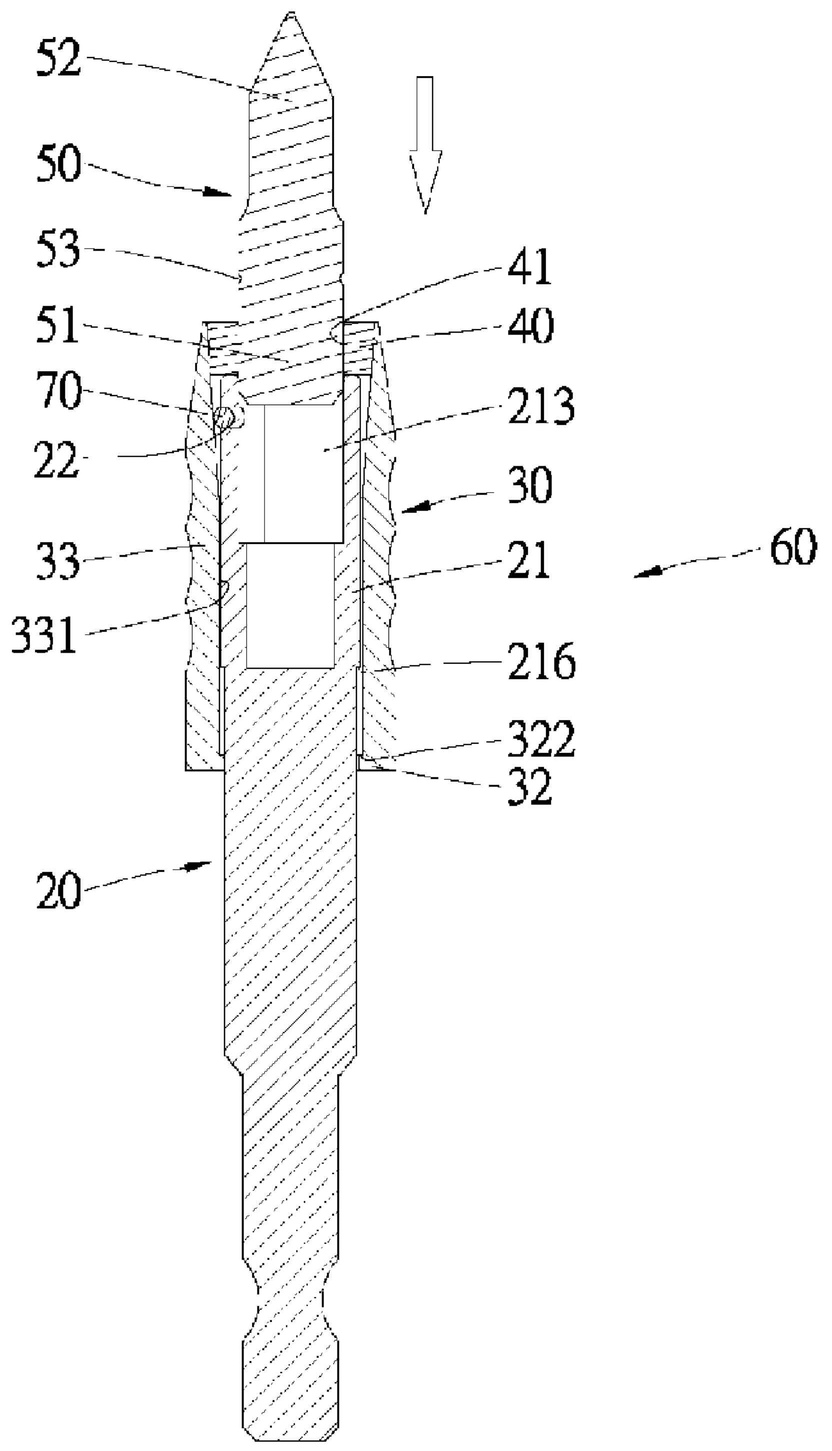
FIG. 7 is a cross-sectional view of a bit driven by the chuck shown in FIG. 6.
Figure 8:
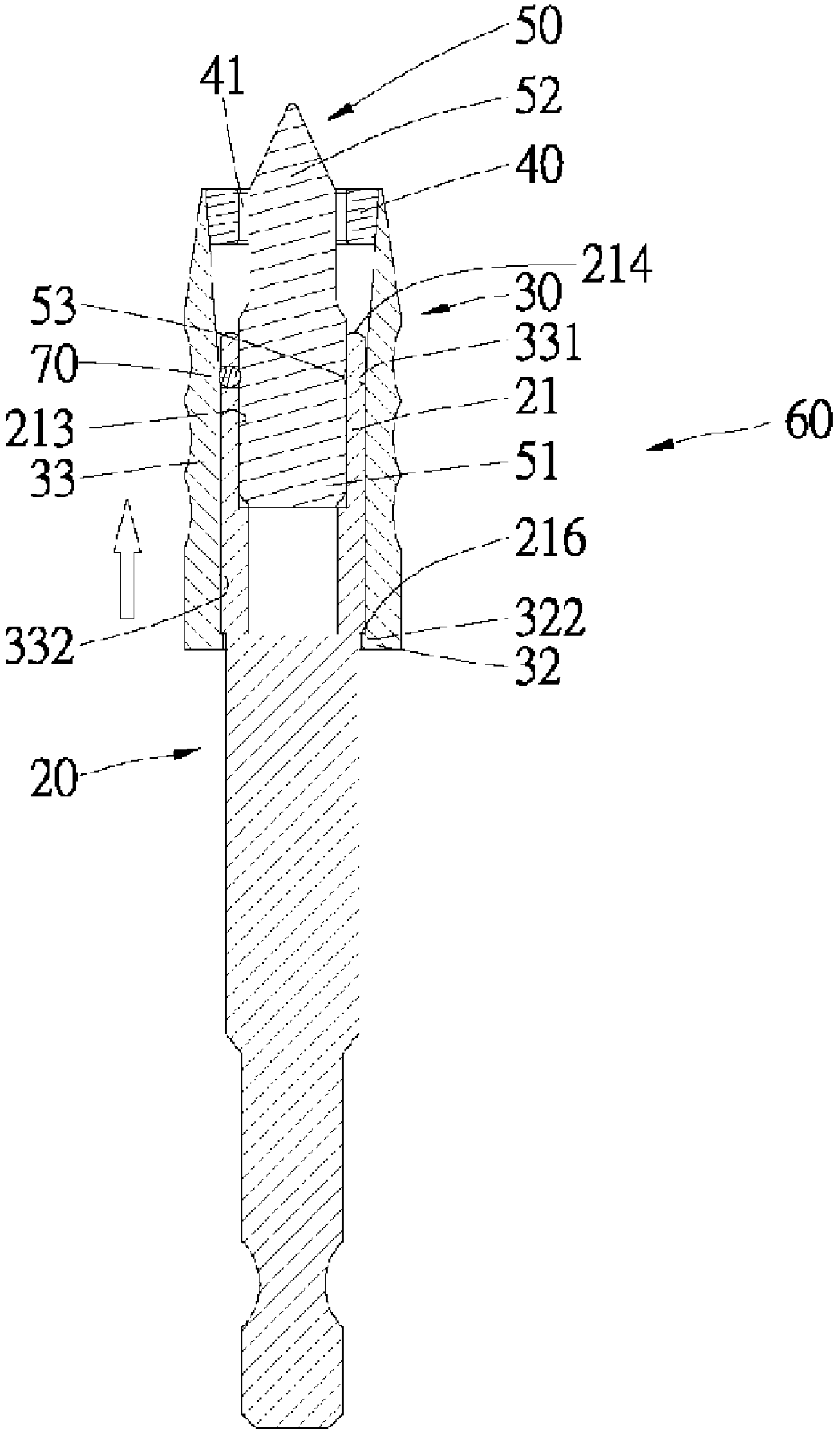
FIG. 8 is a cross-sectional view of the bit and the chuck in another position than shown in FIG. 7.

Referring to FIG. 4, the root 51 of the bit 50 is inserted in the space 23. The shank of the bit 50 is disposed in the taper space 311. The tip 52 of the bit 50 is exposed from the chuck 10. Thus, the bit 50 is firmly held by the chuck 10 while the tip 52 of the bit 50 can be engaged with a screw for example.

Referring to FIGS. 5 through 8, there is shown a chuck 60 according to a second embodiment of the present invention. The chuck 60 is identical to the chuck 10 except including a detent 70 and defining an aperture 22 in communication with the space 213. The detent 70 may be in the form of a ball disposed in the aperture 22. The first end 31 can push a portion of the detent 70 so that an opposite portion of the detent 70 can retain the root 51 in the space 213.

Figure 9:
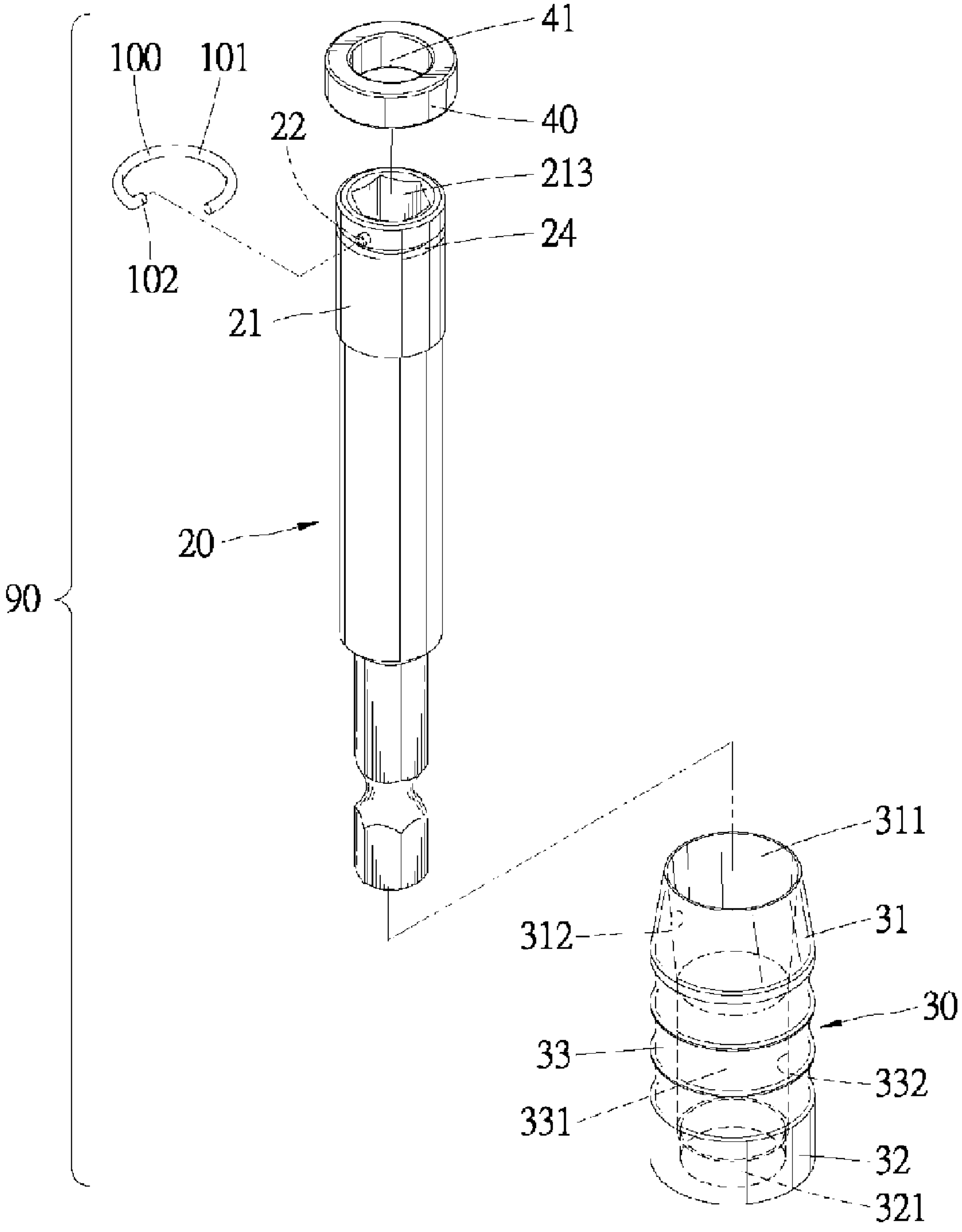
FIG. 9 is an exploded view of a chuck according to the third embodiment of the present invention.
Figure 10:
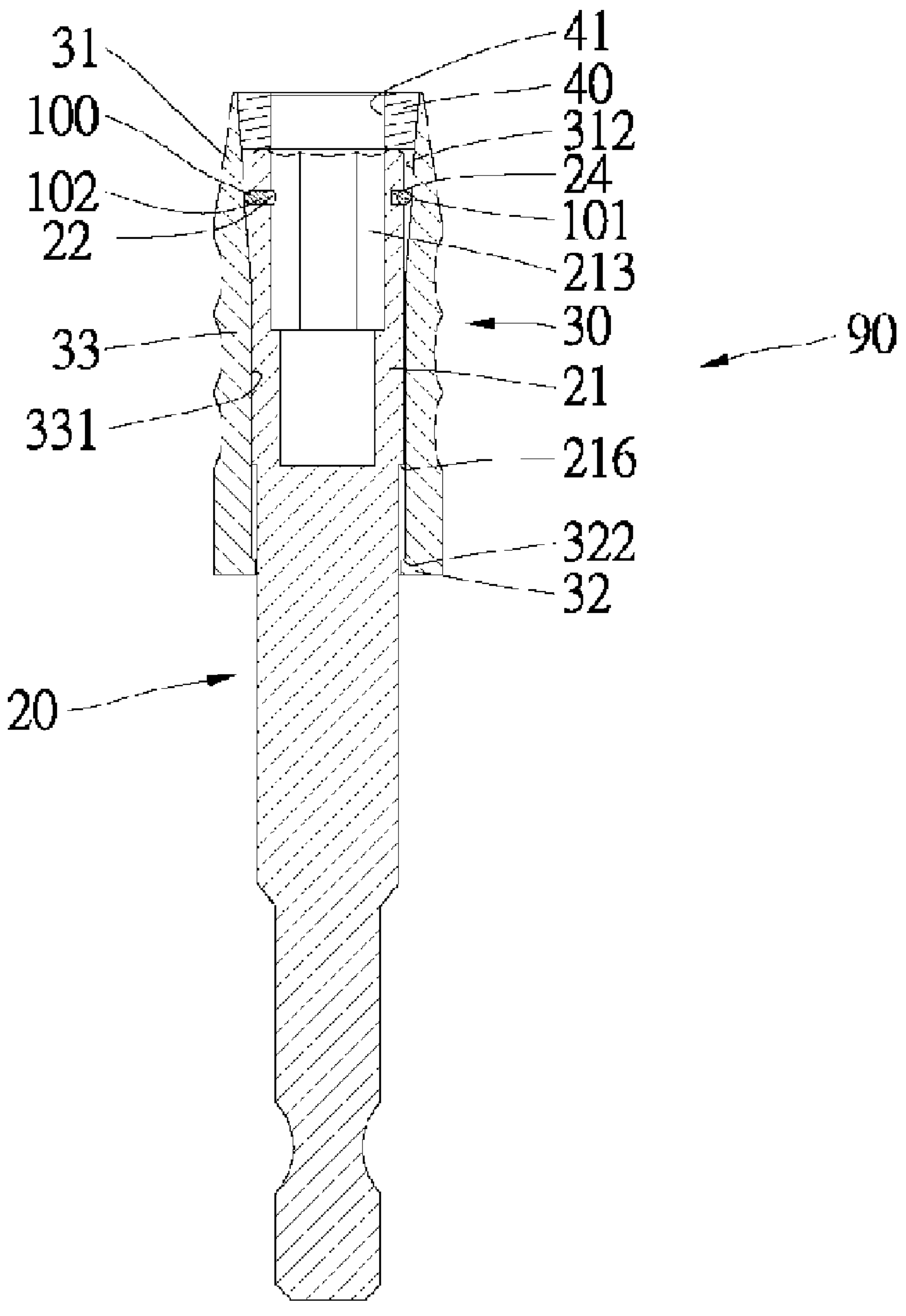
FIG. 10 is a cross-sectional view of the chuck shown in FIG. 9.
Figure 11:
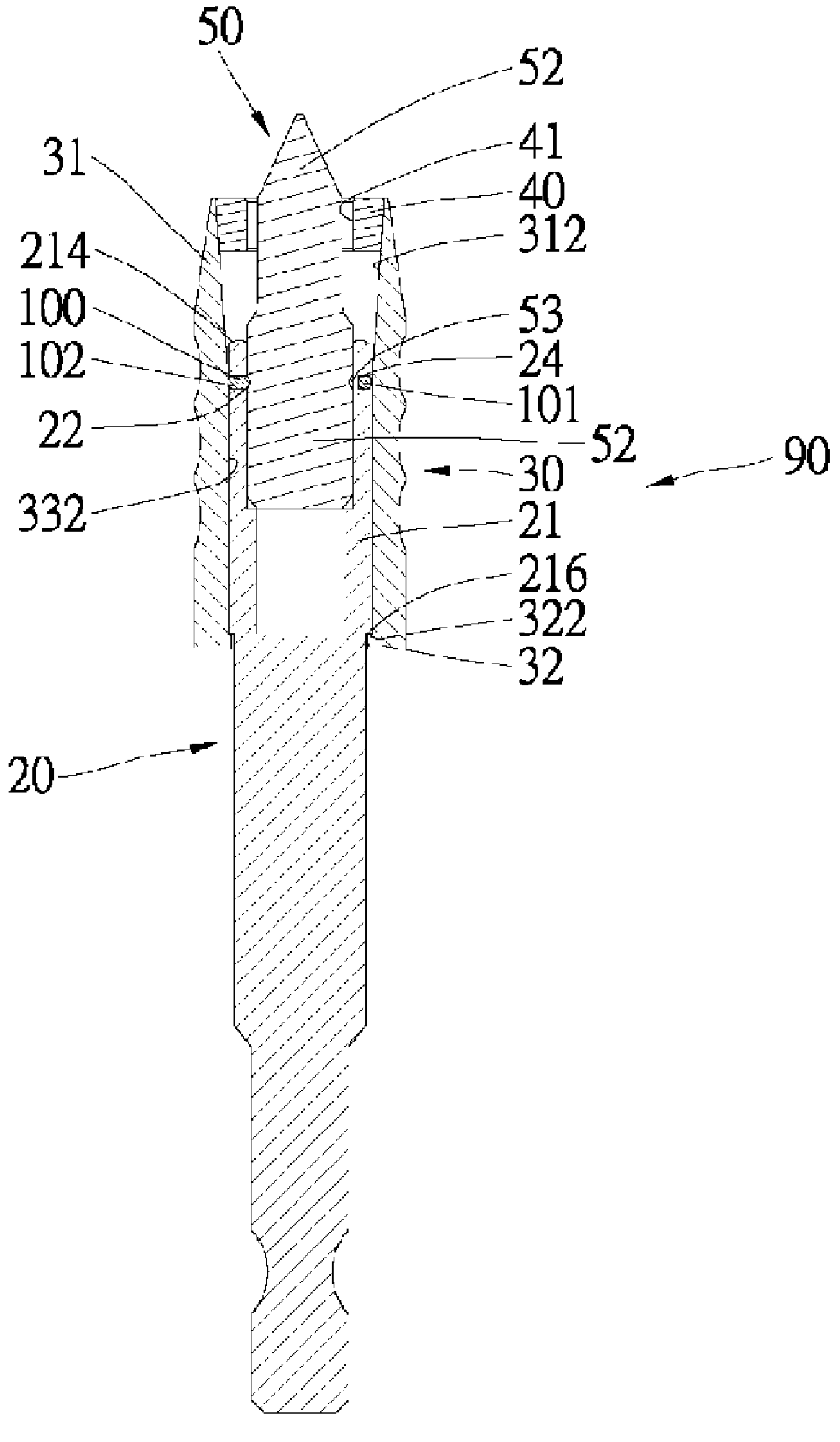
FIG. 11 is a cross-sectional view of a bit driven by the chuck shown in FIG. 10.

Referring to FIGS. 9 through 11, there is shown a chuck 90 according to a third embodiment of the present invention. The chuck 90 is identical to the chuck 60 except including a retaining element 100 instead of detent 70 and defining a groove 24 in an external side of the socket 21. The groove 24 is in communication with the aperture 22. The retaining element 100 includes a C-shaped portion 101 disposed in the groove 24 and a tip 102 inserted into the space 213 through the aperture 22. The tip 102 of the retaining element 100 can retain the root 51 in the space 213.

Figure 12:
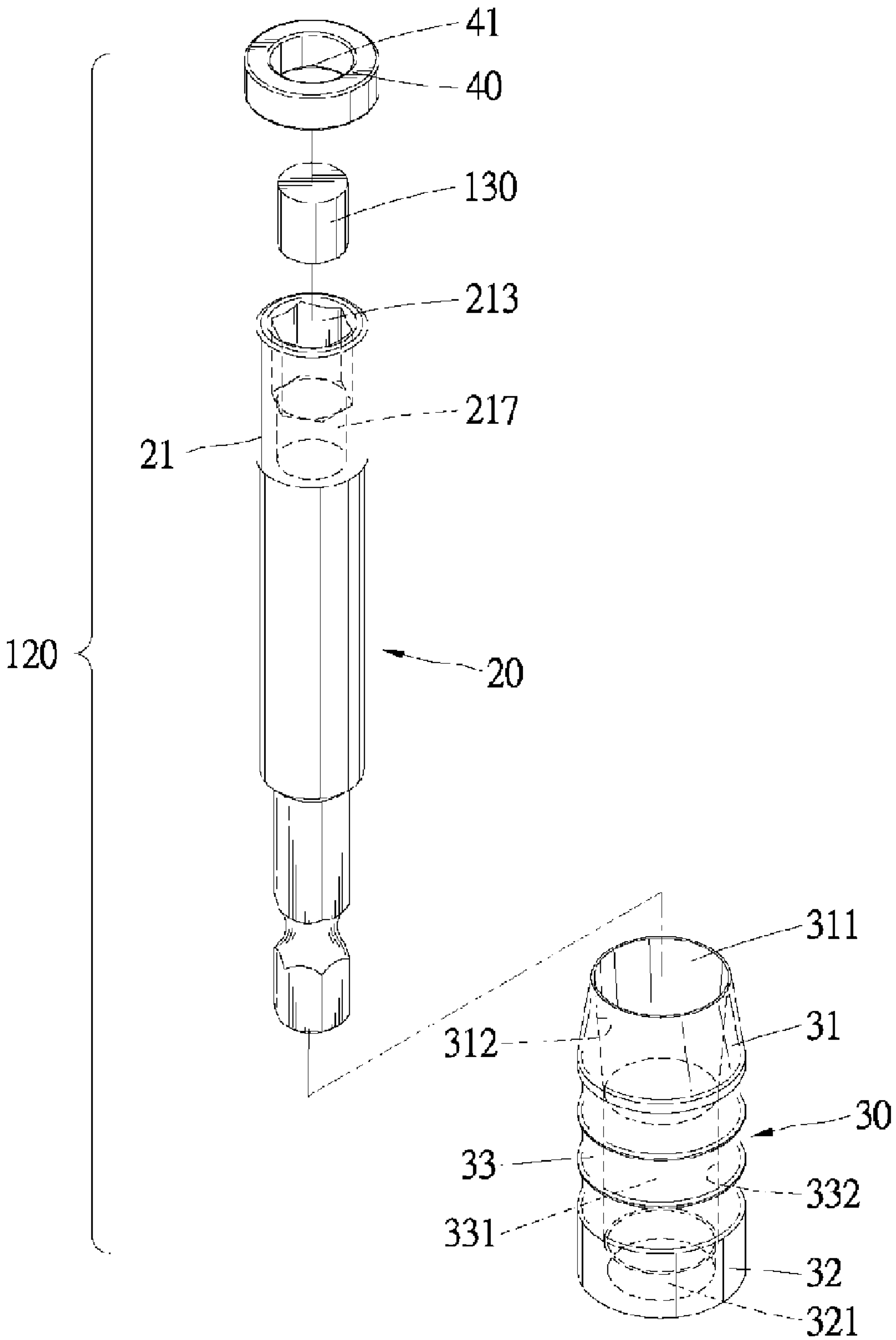
FIG. 12 is an exploded view of a chuck according to the fourth embodiment of the present invention.
Figure 13:
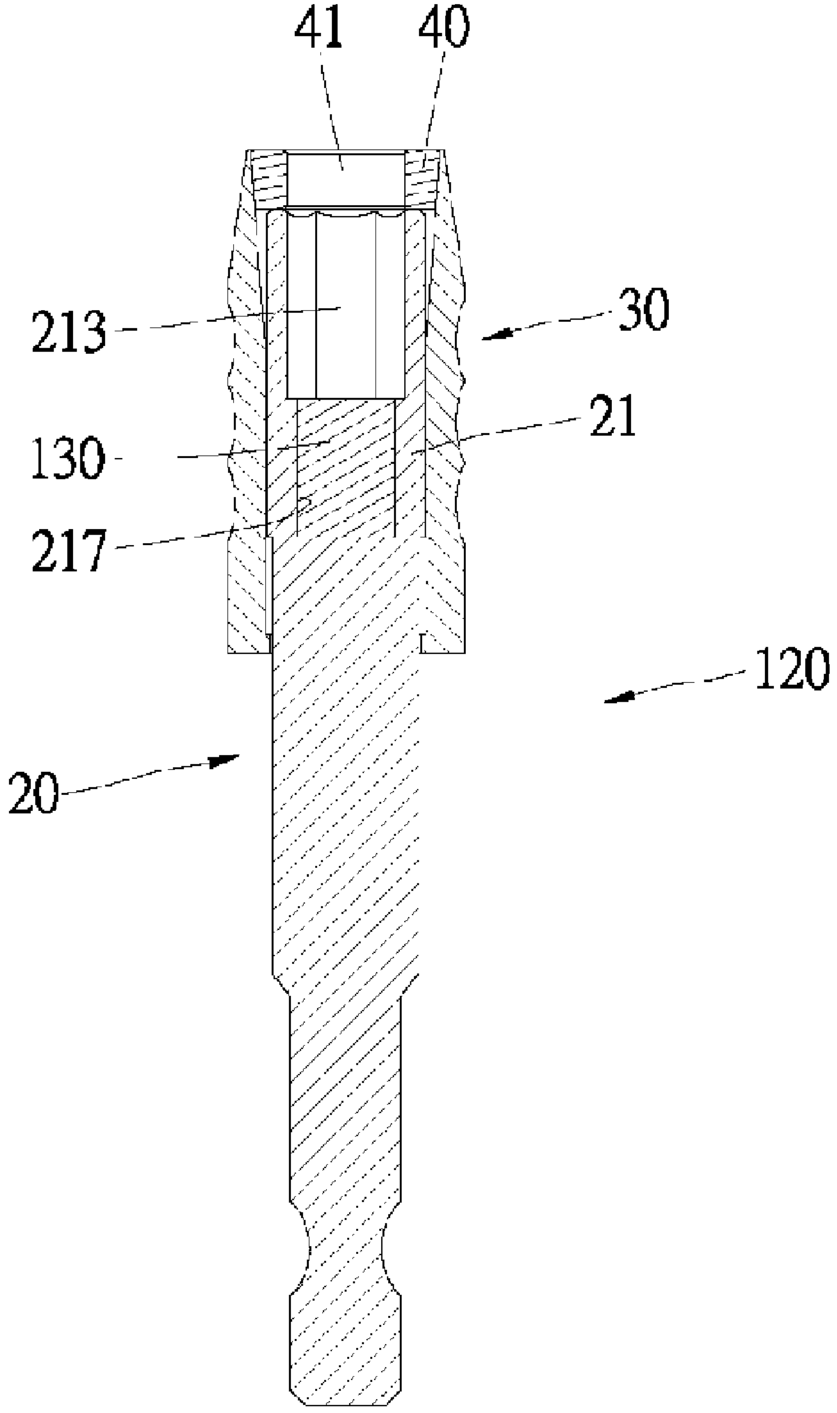
FIG. 13 is a cross-sectional view of the chuck shown in FIG. 12.
Figure 14:
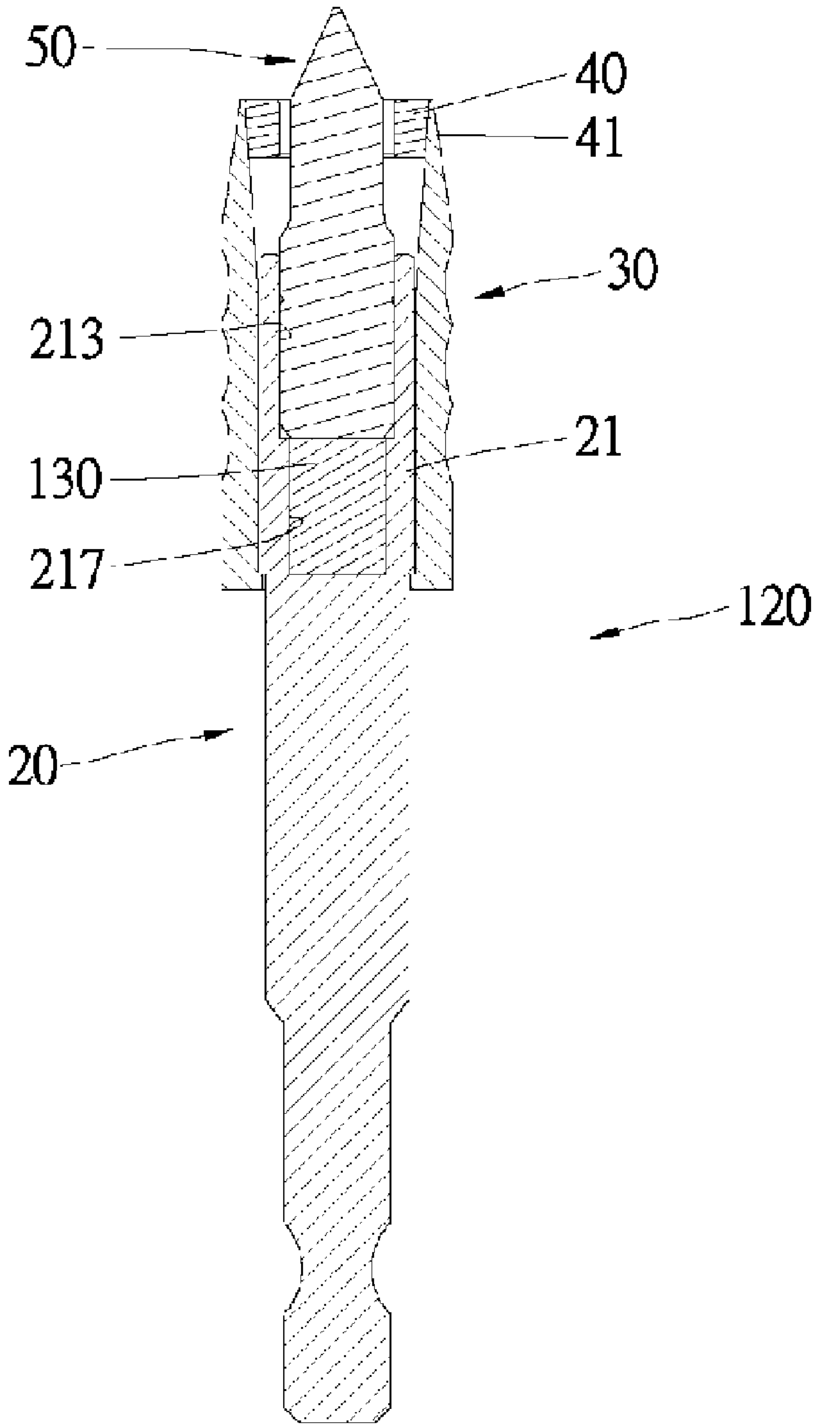
FIG. 14 is a cross-sectional view of a bit driven by the chuck shown in FIG. 13.

Referring to FIGS. 12 through 14, there is shown a chuck 120 according to a fourth embodiment of the present invention. The chuck 120 is identical to the chuck 10 except including a magnet 130 fit in the space 213. The magnet 130 can attract the bit 50.

The primary advantage of the chuck according to the present invention is a low cost due to a simple structure made of a small number of elements in a short process.

The present invention has been described via the detailed illustration of the embodiments. Those skilled in the art can derive variations from the embodiments without departing from the scope of the present invention. Therefore, the embodiments shall not limit the scope of the present invention defined in the claims.

What is claimed is:

1. A chuck comprising: a driving element comprising a socket for receiving a bit, a shank extended from and a shoulder formed between the socket and the shank; a sleeve movably installed on the driving element, wherein the sleeve comprises a shoulder formed on an internal side for contact with the shoulder of the driving element for avoiding detachment thereof from the driving element in a direction; and a restraint fit in a taper space in the sleeve so that the restraint is firmly connected to the sleeve for avoiding detachment of the sleeve from the driving element in an opposite direction.

2. The chuck according to claim 1 wherein the socket comprises an edge for contact with the restraint.

3. The chuck according to claim 1 wherein the sleeve defines a taper space toward the shank.

4. The chuck according to claim 1 wherein the restraint is a magnet.

5. The chuck according to claim 1 wherein the restraint comprises an annular configuration.

6. The chuck according to claim 1 comprising a detent, wherein the sleeve defines a space for receiving the bit and an aperture through which the detent can be inserted into the space for retaining the bit.

7. The chuck according to claim 6 wherein the sleeve comprises an internal side that defines a taper space toward the shank so that the detent is moved into the space defined in the socket when the sleeve is moved toward the bit.

8. The chuck according to claim 1 comprising a retaining element comprising a C-shaped portion installed on the socket and a tip extended from the C-shaped portion, wherein the socket defines a space for receiving the bit and an aperture through which the tip of the retaining element can be inserted into the space defined in the socket for retaining the bit.

9. The chuck according to claim 8 wherein the socket defines a groove in an external side for receiving the C-shaped portion of the retaining element.

10. The chuck according to claim 1 comprising a magnet fit in the socket for attracting the bit.

* * * * *